Oct. 23, 1951          K. R. HATT          2,572,721
COMBINATION LEADER, TROLLING SPINNER AND FISHHOOK
Filed April 11, 1950
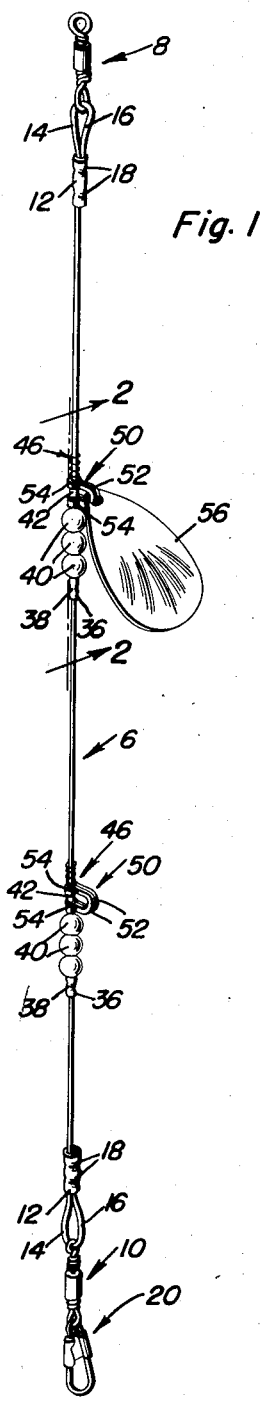
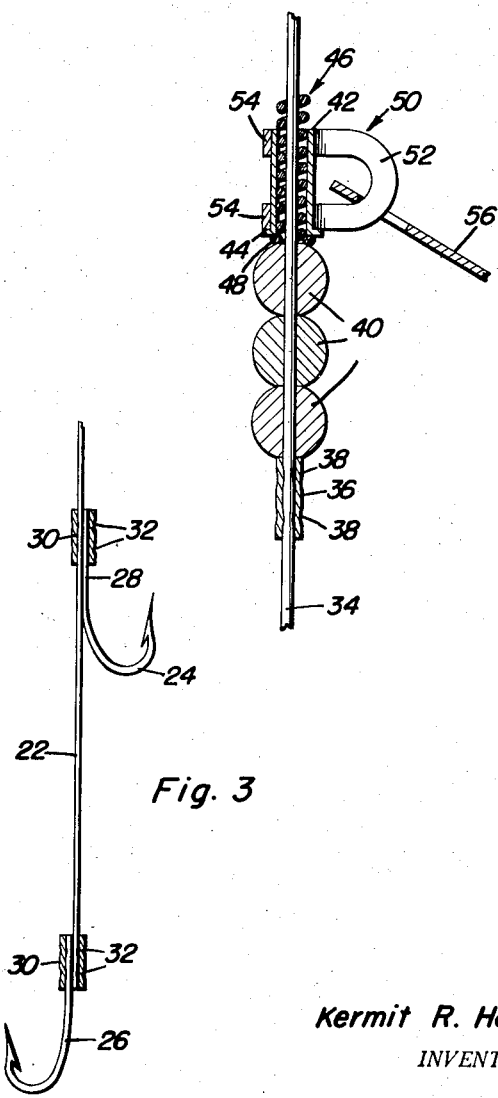
Kermit R. Hatt
INVENTOR.

Patented Oct. 23, 1951

2,572,721

UNITED STATES PATENT OFFICE 2,572,721

COMBINATION LEADER, TROLLING SPINNER, AND FISHHOOK

Kermit R. Hatt, Woburn, Mass.

Application April 11, 1950, Serial No. 155,225

4 Claims. (Cl. 43—42.19)

1

The present invention relates to fishing tackle in general, but has more specific reference to a novel and improved leader with unique trolling spinner assemblies thereon.

An object of the invention is to provide a novelly constructed spinner assembly which is characterized by a bearing, a clevis rigidly secured to and solely carried by the bearing, a spinner attached to the clevis, and a simple coil spring which is associated with the bearing in a manner to function as an elastic bushing for said bearing.

More specifically, novelty is predicated upon the combination of a flexible leader, stop means fixed on said leader at a predetermined point, at least one bead mounted slidably and rotatably on said leader and bearing against said stop means, an elastic coil spring bushing slidable and rotatable on said leader and having one end adapted to rest against said bead, a bearing sleeve snugly encasing said spring bushing, said sleeve being of sheet material and having an outstanding flange at that end adjacent to said bead, at least one convolution of said spring bushing projecting beyond said flanged end, said one convolution being free of constriction by the sleeve and interposed between said bead and flange, the other end of said spring bushing projecting through and beyond the corresponding end of said sleeve, and a spinner attaching clevis directly attached to and solely carried by said sleeve.

Then, too, novelty is predicated on the aforementioned spoon assembly which, as an attachment for a leader, is characterized by a sheet material bearing sleeve of cylindrical cross-section having an outstanding annular flange at one end, a coil spring bushing fitting through the bore of said sleeve, said spring being of a length slightly greater than the length of the sleeve, one end convolution of said spring being radially expanded to a diameter greater than the diameter of the bore of the sleeve and resting against said flange, the remainder of the spring being of a diameter slightly less than the diameter of said bore, a clevis embodying eye members embracing and securely attached to said sleeve, and a spinner carried by said clevis.

Other objects and advantages will become more readily apparent from the following description and the accompanying illustrative drawings.

In the accompanying sheet of drawings, wherein like numerals are employed to designate like parts throughout the views:

2

Figure 1 is a perspective view of a leader with facilities thereon constructed in accordance with the principles of the present invention;

Figure 2 is an enlarged fragmentary sectional and elevational view taken approximately on the plane of the line 2—2 of Figure 1, looking in the direction of the arrows; and Figure 3 is a further fragmentary view in section and elevation showing the manner in which the fishhooks are especially attached to and secured on the leader.

Referring now to the drawings by reference numerals and accompanying lead lines, and with particular reference to the construction shown in Figure 1, the leader is denoted by the numeral 6 and is of appropriate length and material. Reference is had first to the loop means at opposite ends for attaching the barrel type swivels 8 and 10, respectively. This is done through the use of a metal or equivalent sleeve 12 which is slipped over the end portion of the leader to occupy a position inwardly of the free end of the leader. The portion of the leader beyond the sleeve is extended at 14 and then by a return bend is fashioned into a loop 16 whose free end is threaded into and secured on the leader proper by way of the sleeve 12. The sleeve is indented or otherwise crimped as at 18 and is thus clenched securely holding the coacting portions of the leader and fashioning a reliable loop for attachment thereto of the swivel 8. The construction at both ends is the same and the same reference numerals are, for this reason, utilized. At the bottom in the showing in Figure 1, a clasp-type fastener for a fishhook (not shown) is denoted at 20.

Reference is had now to Figure 3 wherein another phase of the invention is disclosed. Here, the leader is denoted by the numeral 22 and is provided with novelly attached fishhooks 24 and 26. These are conventional hooks, as is obvious. The shank portion of the hook 28 is placed alongside and parallel to the leader and is fastened in place by the sleeve 30. The sleeve surrounds both the leader and shank of the hook and is indented or otherwise crimped as at 32, and thus clenched in place. Thus, the same type of sleeve which is used for fastening or making the aforementioned loop is likewise applicable to satisfactory use in mounting a fishhook on a leader.

The trolling spinners or spoons on the intermediate portion of the leader are of the same construction, and the description of one assembly will suffice for both. Referring to Figure 2, the leader is denoted by the numeral 34. Here, a sleeve 36 is fitted on the leader and indented or otherwise crimped, as at 38—38, to secure the sleeve at a fixed point. The sleeve, in this instance, constitutes a stop or an abutment for the several centrally apertured, freely idling beads 40. One bead is shown resting against the sleeve. Another bead is shown providing an end thrust for the spinner assembly. The latter comprises a bearing 42 which also takes the form of a sleeve and which is provided at one end with an outstanding annular flange 44. The bearing is fitted on the leader by way of a coiled spring 46 having one convolution or coil 48 resting against the coacting end thrust bead. This coil spring provides an adequate and satisfactory bushing for the bearing. The bearing, in turn, provides a stable mount for the yoke-like clevis 50. The clevis is formed from a single length of metal having coacting opposed, U-shaped members 52 and provided with clamping eyes 54—54. The eyes securely embrace and are thus attached to the bearing sleeve 42. The principal novelty in this spinner construction or assembly is in having the coiled spring 46 serve as an elastic bushing for the bearing 42 so as to provide a substantially wear-proof connection between the spinner assembly and leader. The bearing sleeve 42 provides a stable mount for the spaced connecting eyes 54—54 of the clevis proper. The clevis, in turn, serves as attaching means for the trolling spoon 56.

It is understood that with the construction herein shown and described, leaders may be made with loops at both ends to accommodate swivels. The loops, in turn, will permit several leaders to be joined together in end-to-end relationship. It is also within the purview of the invention to attach the fishhooks to the leader by way of assembling and retaining sleeves. Primarily, I am interested in the specific construction of the means shown in Figure 2 comprising the bearing sleeve 42, the beads 40, stop sleeve 36 and clevis 50, providing a specially made spinner assembly.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

Having described the invention, what is claimed as new is:

1. Trolling means of the class shown and described comprising, in combination, a flexible leader, a coil spring surrounding said leader, stop means fixed on said leader to limit the sliding of the spring in one direction, a bearing sleeve surrounding and encasing said spring, the latter serving as a bushing for said sleeve, a clevis having eye portions rigidly embracing said sleeve, and a spinner carried by said clevis.

2. The structure defined in claim 1, wherein said sleeve is of sheet material and is provided at one end with an outstanding annular flange, at least one of the convolutions of said spring projecting beyond said sleeve and being interposed between said stop means and said flange.

3. Trolling means of the class described comprising, in combination, a flexible leader, stop means fixed on said leader at a predetermined point, at least one bead mounted slidably and rotatably on said leader and bearing against said stop means, an elastic coil spring bushing slidable and rotatable on said leader and having one end adapted to rest against said bead, a bearing sleeve snugly encasing said spring bushing, said sleeve being of sheet material and having an outstanding flange at that end adjacent to said bead, at least one convolution of said spring bushing projecting beyond said flanged end, said one convolution being free of constriction by the sleeve and interposed between said bead and flange, the other end of said spring bushing projecting through and beyond the corresponding end of said sleeve, and a spinner attaching clevis directly attached to and solely carried by said sleeve.

4. A spoon assembly adapted to be mounted on a leader and comprising a sheet material bearing sleeve of cylindrical cross-section having an outstanding annular flange at one end, a coil spring bushing fitting through the bore of said sleeve, said spring being of a length slightly greater than the length of the sleeve, one end convolution of said spring being radially expanded to a diameter greater than the diameter of the bore of the sleeve and resting against said flange, the remainder of the spring being of a diameter slightly less than the diameter of said bore, a clevis embodying eye members embracing and securely attached to said sleeve, and a spinner carried by said clevis.

KERMIT R. HATT.

REFERENCES CITED

The following references are of record in the file of this patent:

UNITED STATES PATENTS

| Number | Name | Date |
| --- | --- | --- |
| 520,594 | Harlow | May 29, 1894 |
| 648,360 | Pflueger | Apr. 24, 1900 |
| 1,156,152 | Krenrick | Oct. 12, 1915 |
| 1,339,189 | Frensdorf | May 4, 1920 |
| 1,678,448 | Shannon | July 24, 1928 |
| 1,698,193 | Geer | Jan. 8, 1929 |
| 2,189,841 | Skoverski | Feb. 13, 1940 |
| 2,481,445 | Premo, Jr. | Sept. 6, 1949 |
| 2,486,635 | Coats | Nov. 1, 1949 |

FOREIGN PATENTS

| Number | Country | Date |
| --- | --- | --- |
| 3,631 | Great Britain | Nov. 23, 1905 |